United States Patent [19]

Lehti

[11] Patent Number: 4,689,017

[45] Date of Patent: Aug. 25, 1987

[54] DRAWINGS AID FOR MAKING DRAWINGS IN PERSPECTIVE

[76] Inventor: Pauli Lehti, Tuulastie 5, 50190 Mikkeli 19, Finland

[21] Appl. No.: 831,274

[22] Filed: Feb. 20, 1986

[51] Int. Cl.[4] .............................................. G09B 11/00

[52] U.S. Cl. ....................................... 434/91; 434/90; 33/1 K

[58] Field of Search ................ 434/91, 92, 90; 33/1 K

[56] References Cited

U.S. PATENT DOCUMENTS

| | | | |
|---|---|---|---|
| 1,618,164 | 2/1927 | Birker | 33/1 K |
| 1,964,197 | 6/1934 | Edison | 33/1 K |
| 2,487,690 | 11/1949 | Black et al. | 434/90 |
| 3,086,296 | 4/1963 | Bergstrom | 434/90 |
| 3,493,727 | 2/1970 | Hosokawa et al. | 219/505 |
| 3,660,903 | 5/1972 | Caperton, Jr. | 434/90 X |

*Primary Examiner*—William H. Grieb

*Attorney, Agent, or Firm*—Browdy and Neimark

[57] ABSTRACT

A drawing aid for use in making drawings in perspective, having at least one transparent chart unit with proper angle, distance and height scales needed for making drawings in perspective. A drawback of known drawing aids of this kind is that they have been provided with scales which are exceedingly difficult to read and that, in the course of drawing, auxiliary lines are invariably produced which clutter up the drawing. The chart unit of the invention has a first chart corresponding to the horizontal plane and marked with radial angles and arcs corresponding to distance, a second chart corresponding to the vertical plane and marked with radial angles and vertical lines corresponding to distance, and an image plane chart corresponding to the image plane, the latter usually serving as a drawing substrate with coordinates consistent with the angle scales of the first and second charts.

7 Claims, 7 Drawing Figures

DRAWINGS AID FOR MAKING DRAWINGS IN PERSPECTIVE

BACKGROUND OF THE INVENTION

The object of the present invention is a drawing aid for producing perspective drawings, which consists of at least one transparent chart unit carrying the proper angle, distance and height scales to be used when drawing figures in perspective.

A drawing aid for drawing figures in perspective is disclosed e.g. in the U.S. Pat. No. 3,492,727. The drawback of the known aid of this kind is that, having numerous scales, it is very difficult to read, and in drawing the figure auxiliary lines have to be traced, which tend to confuse the drawing and hamper the drawing of detailed parts. Another drawback of the known aids of this kind is that the locations of the vanishing points are predetermined and therefore the viewing direction is always the same in all perspective figures.

SUMMARY OF THE INVENTION

The object of the present invention is to eliminate the above drawbacks and to provide a drawing aid to a new type which is quick and easy to operate. The drawing aid of the invention is characterized in that the chart unit has: a diagram inscribed with radial angles corresponding to the horizontal plane and arcs corresponding to distance; a diagram corresponding to the vertical plane inscribed with radial angles and vertical lines corresponding to distance; and an image plane diagram corresponding to the image plane, the latter normally serving as a drawing substrate and having coordinates consistent with the angle scales of the first two diagrams. By means of the invention it is possible first and foremost to position the point to be processed at a desired distance and under a desired angle to the left or right in relation to the viewing direction. By using the chart, the requisite coordinates are found and the corresponding points are plotted on the image plane, whereafter by connecting these points the perspective drawing can be directly created without need of auxiliary lines whatsoever which would clutter up the drawing.

A preferred embodiment of the present invention is characterized in that the image plane is a cross-ruled chart which can be mounted on the drawing board and overlayed with a sheet of transparent drawing paper. Several such charts in different sizes may be provided, thus enabling perspective drawings in desired size to be obtained simply by replacing the image plane chart with another. The creation of perspective figures in very large size is thus also rendered possible. The size of the drawing may subsequently be changed by photographic processing, and the drawing may be combined with photographs. The charts of the invention are also applicable in examining perspective drawings.

BRIEF DESCRIPTION OF THE DRAWING

The invention shall be described in the following by means of an example and referring to the enclosed drawings, where.

DESCRIPTION OF PREFERRED EMBODIMENTS

Figure 1:
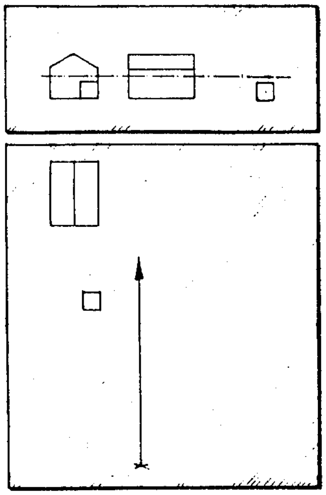
FIG. 1 presents a simplified house drawing with a cube-shaped object, such as garbage container, in front of the house and the viewing direction being as indicated by an arrow.
Figure 3:
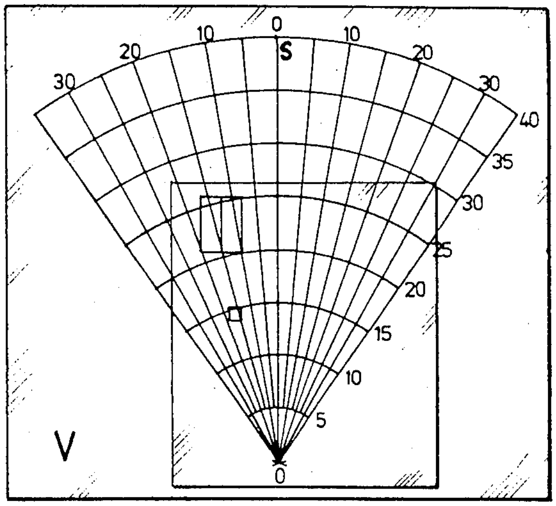
FIG. 3 shows the horizontal plane chart superimposed on the drawing and viewed directly from above.
Figure 2:
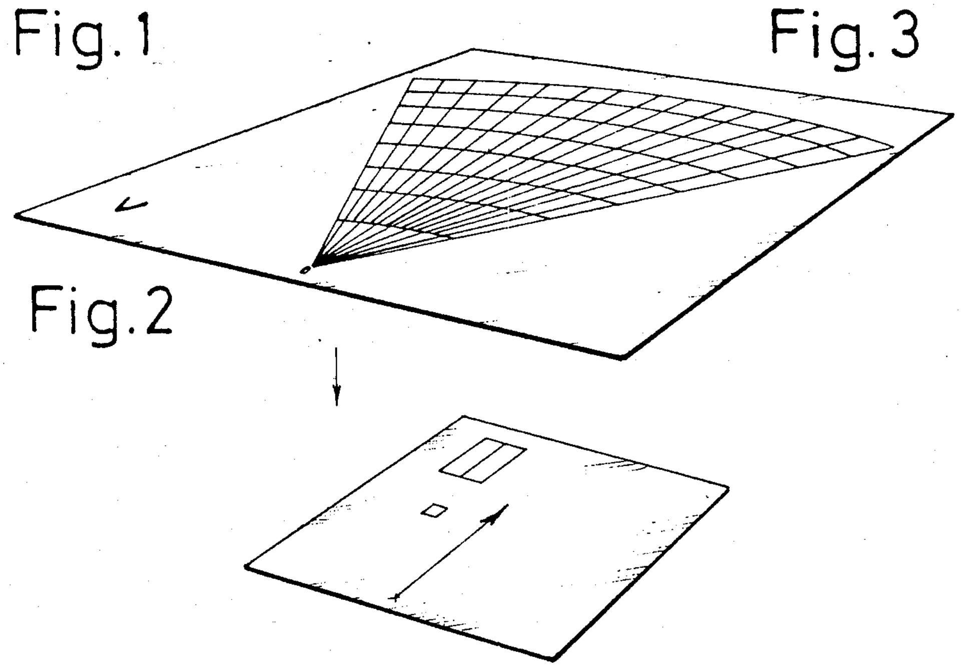
FIG. 2 illustrates the superimposing of the horizontal plane chart on another drawing.
Figure 4:
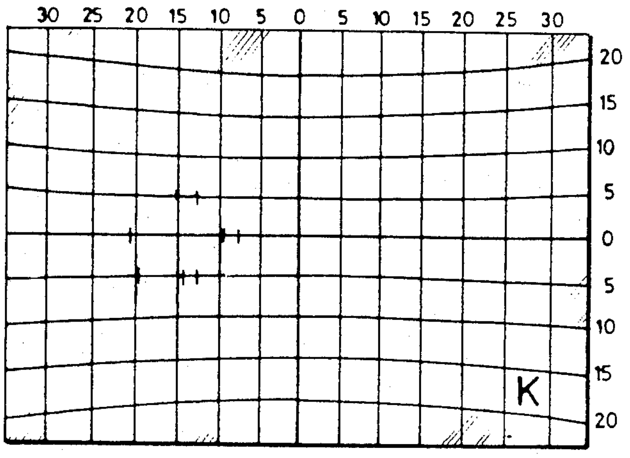
FIG. 4 shows corner points derived from FIG. 3 and plotted on a drawing substrate.
Figure 5:
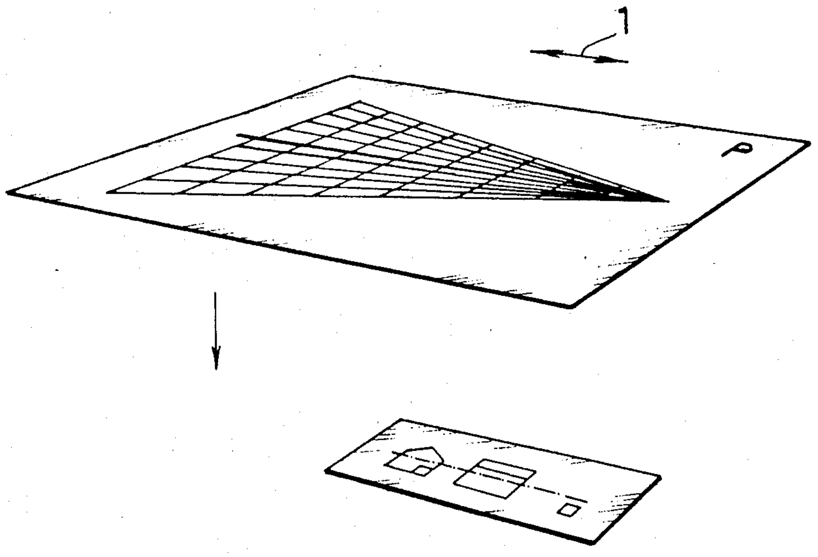
FIG. 5 illustrates the superimposing of the vertical plane chart on another drawing.
Figure 6:
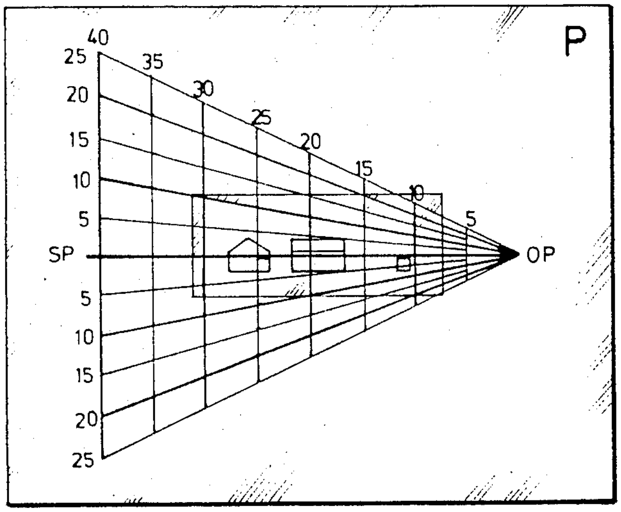
FIG. 6 shows the vertical plane chart viewed directly from above.
Figure 7:
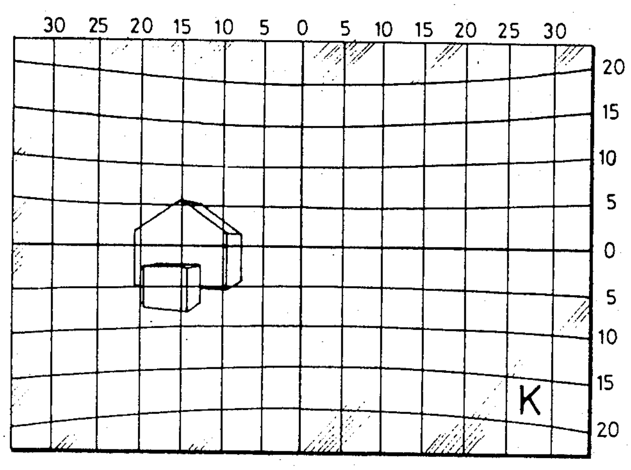
FIG. 7 shows the figures shown in the drawing, traced on the drawing substrate, in the perspective drawing.

The drawing aid consists of charts comprising a horizontal plane chart V, a vertical plane chart P and an image plane chart K. The chart V is marked with radial angles from zero to 35° to the left and from zero to 35° to the right, and with arcs corresponding to distance, the distances being marked from zero to 40 meters, for instance. The chart P is marked, consistent with the vertical plane, with vertical lines corresponding to radial angles upwards from zero to 25° and downwards from zero to 25°, referred to the horizontal plane, and with vertical lines marking the distance. The chart P also carries a scale from zero to 40 meters. The cross-ruling of the image plane chart K is consistent with the horizontal and vertical angle scales of the charts V and P, respectively. The V and P charts should be as transparent as possible. The drawing substrate K may be either transparent or opaque. The point O of the chart V has to be placed to coincide with the desired viewing point and the line OS, with the desired viewing direction. The distances are marked on the distance scale according to the map scale that was enployed in preparing the figure, general layout, site plan, etc. used in the drawing process. Drawing of the perspective figure proceeds as follows: The location, on the chart K, of the point to be processed is determined in that by means of the chart V the angle, to the right or to the left of the viewing directions OS, corresponding to the direction of this point, is first found. The location of the point is marked, on the basis of the number of degrees defining said angle, on a sheet of transparent material, such as paper, attached upon the image plane chart K. Next, the distance of the point is read on the scale V with the aid of the distance scale. The chart P is placed upon a section, elevation or other vertical projection drawing so that the line corresponding to the viewing direction is horizontal on the viewing height consistent with the main scale. The chart P is moved in accordance with the distance found on the distance scale of the chart V in the direction indicated by the arrow 1, so that the viewing point O will have the proper distance from the corner of the building or equivalent, which is being processed.

Thereafter, for instance the direction angles of the lowest and highest points of the corner upwards or downwards from the viewing direction OP–SP are read from the chart P. The locations of the points on the image plane chart K will be determined by the direction angle thus obtained, with the aid of the numbers of degrees. The figure will thus emerge point by point, or vertical edge by vertical edge, on the transparent paper mounted over the drawing substrate K. The size of the figure is predetermined by the size of the image plane chart K. The scales of the charts V and P may be different as to the distance scales, but their map scale must be the same as that of the underlying drawings. Image plane charts K may be provided in a plurality of different sizes, whereby the size of the figure can be selected according to circumstances. As a rule it is advisable to draw the figure as large as possible and reduce it photographically to its final size. The drawing accuracy can be increased by increasing the line density of the charts.

I claim:

1. A drawing aid for use in making drawings in perspective, including at least one transparent chart unit with angle, distance and height scales for making drawings in perspective, wherein the chart unit comprises a first chart corresponding to the horizontal plane and marked with radial angles for horizontal position with respect to an origin for the perspective view and with arcs corresponding to distance from the origin for the perspective view, a second chart corresponding to the vertical plane and marked with radial angles corresponding to vertical position with respect to said origin of the perspective view and with vertical lines corresponding to distance from the origin, and an image plane chart corresponding to the image plane, said image chart having a coordinates the angle scales of said first and second charts.

2. A drawing aid according to claim 1, wherein the image plane chart is mountable on the top of a drawing board, and a sheet of transparent drawing paper as a drawing substrate can be placed over said image plane chart, said image plane chart being cross-ruled according to said coordinates of said angle scales.

3. A drawing aid according to claim 1, wherein the image plane chart is a drawing substrate on which the perspective drawing is executed.

4. The aid of claim 1, said coordinates of said image plane chart comprising a first plurality of parallel lines for the radial angle coordinate of said second chart, and a plurality of second image plane lines that are increasingly curved to be increasingly spaced from each other in the direction away from a respective one of said parallel lines of each of said first and second pluralities.

5. The aid of claim 4, said respective parallel line of said second plurality defining the horizontal from said origin of the perspective view.

6. The aid of claim 1, said vertical lines on said second chart being straight lines, the angular coordinate of said image plane chart corresponding to the radial angles of said first chart being represented by straight vertical lines on said image plane chart, and the angular coordinate of said image plane chart corresponding to said radial angles on said second chart being represented by a family of curved lines in said image plane chart, the curvature of which increases with distance away from a predetermined radial angle of said second chart.

7. The aid of claim 6, said predetermined radial angle of said second chart defining the horizontal from said origin for the perspective view.

* * * * *